United States Patent

[11] 3,535,999

[72] Inventor Rene Chambon
      Lourdes, France
[21] Appl. No. 741,471
[22] Filed July 1, 1968
[45] Patented Oct. 27, 1970
[73] Assignee Scovill Manufacturing Company
      Waterbury, Connecticut
      a corporation of Connecticut

[54] CONVERTIBLE COOKING DEVICE WITH SLOPING SPIT
      6 Claims, 8 Drawing Figs.
[52] U.S. Cl. .................................................. 99/340
[51] Int. Cl. .................................................. A47j 37/04
[50] Field of Search .................................. 99/340,
      339, 357, 419, 421 +(H), (V), (HH), (HV), 420,
      447, 449, 446, 445, 450, 390, 391, 392, 393

[56] References Cited
      UNITED STATES PATENTS
      2,618,730  11/1952  Panken ....................... 99/340
      2,848,592   8/1958  Mergen ....................... 99/340X
      3,169,470   2/1965  Oatley ......................... 99/340X
      3,447,444   6/1969  Berger et al. ............... 99/339X
      FOREIGN PATENTS
      1,321,926   2/1963  France ........................ 99/419

Primary Examiner—Walter A. Scheel
Assistant Examiner—Leon G. Machlin
Attorney—Dallett Hoopes ABSTRACT: A multipurpose cooking device comprising a box-like structure having a hinged lid including a front wall. The upper wall releasably carries a planar heating element on its underside. The cooking support means within the device slopes up from the back toward the front and means are provided to hold the lid ajar in a position so that the element is parallel to the support means for uniform exposure to the heating element.

INVENTOR.
René Chambon
BY Dallett Hoopes
ATTORNEY.

INVENTOR.
René Chambon

BY Dallett Hoopes

ATTORNEY.

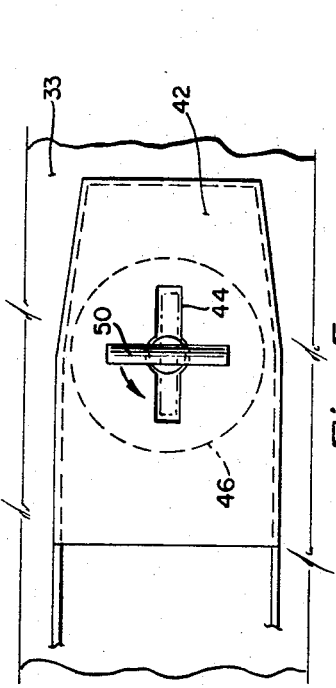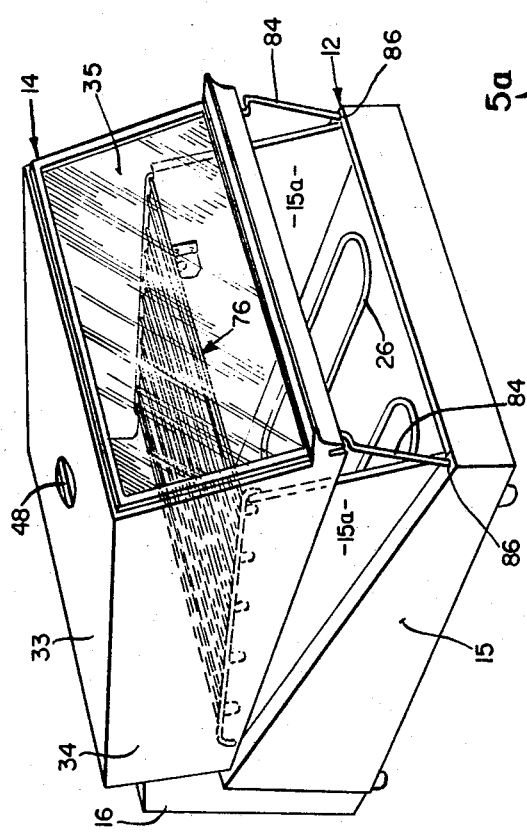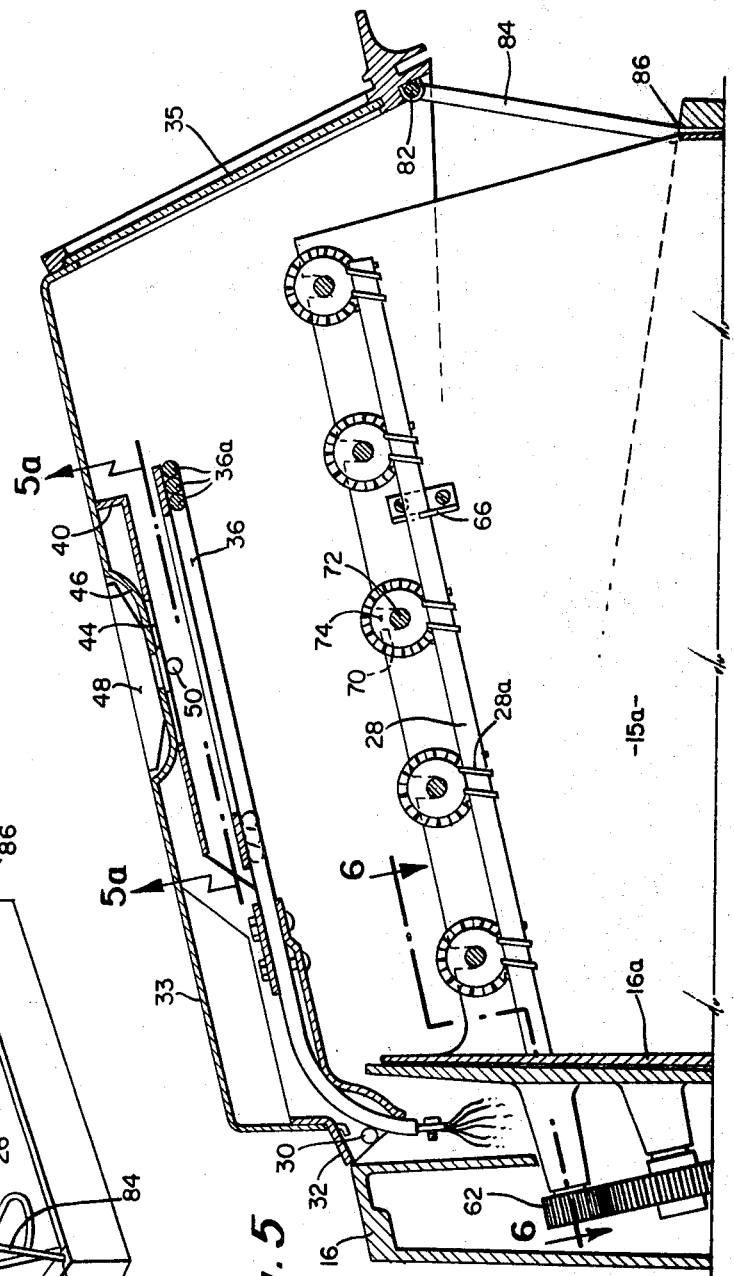

INVENTOR.
René Chambon

CONVERTIBLE COOKING DEVICE WITH SLOPING SPIT

This invention relates to a cooking device. More specifically, this invention relates to a compact cooking device adapted to be plugged into a household outlet and capable of various cooking functions including baking, broiling and rotary barbecuing. Its structure includes means to vary its volumetric capacity and therefore the size of item it can receive. This minimizes the need to heat unused space.

In accordance with the present invention, there is presented a compact cooking device capable of easy shift from baking to even, uniform broiling by simple adjustment of parts without the need for rearrangement of parts or other complicated manipulations. Highly efficient heating means are employed.

Other features of the invention will be apparent from a reading of the following specification including the drawings wherein;

FIG. 4 is a perspective view showing the device as it would be disposed in a broiling operation;

FIG. 5 is a fragmentary sectional enlarged view along the center line of the device disposed as in FIG. 4 except that the barbecue skewers are installed and engaging the drive means;

FIG. 5a is a sectional view taken on the line 5a–5a of FIG. 5;

Figure 1:
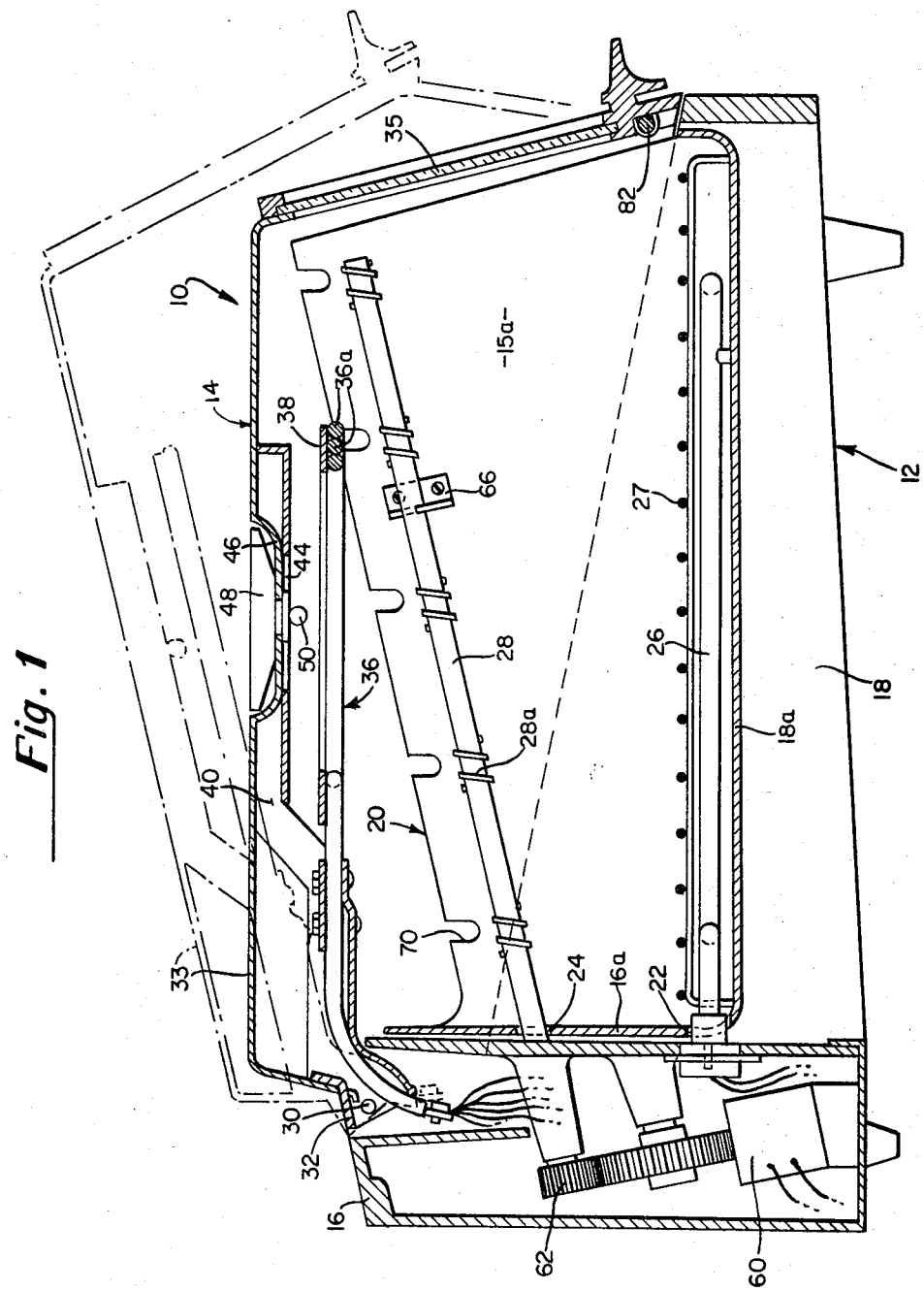
FIG. 1 is a sectional view taken along the center line of a cooking device embodying the invention and showing in full lines the lid in baking position and in phantom the lid of the device held ajar as in a barbecuing operation.

Referring more specifically to the drawings, a cooking device embodying the invention is generally designated 10 in FIG. 1. It comprises a lower element 12 and a lid 14. The lower element (FIG. 2) includes the side wall structure 15 including portions 15a and the rear wall structure 16 including portion 16a. The base structure 18 includes the base structure portion 18a. The side wall portions 15a, rear wall portion 16a, and base portion 18a are preferably formed as a unitary shell removable from the rest of the element 12. As shown, the shell which is generally designated 20, is apertured (FIG. 1) as at 22 and 24 to permit connection of the lower heating element 26, the baking element, and the rotary drive shaft 28, respectively. In use, the base portion 18a supports grill frame 27 for baking.

Disposed in the top of the rear wall structure 16 is a horizontal hinge pin 30 to which is pivotally attached the lid mount 32 which forms the rear of the top wall 33 of the lid 14. The lid has side walls 34 and front wall 35.

Passing through a tunnel formed in the hinge mount 32 as shown are electrical leads which run to the upper heating element 36. As shown, the upper heating element preferably comprises a plurality of contiguous heating rods 36a superposed by a reflector element 38. The upper heating element 36 is rigidly mounted on the hinge mount 32 so as to pivot about the pin 30 with the mount. The mount includes an upper arm 40 which runs parallel to the heating element and rests against the underside of the top wall 33 of the lid 14.

Figure 7:
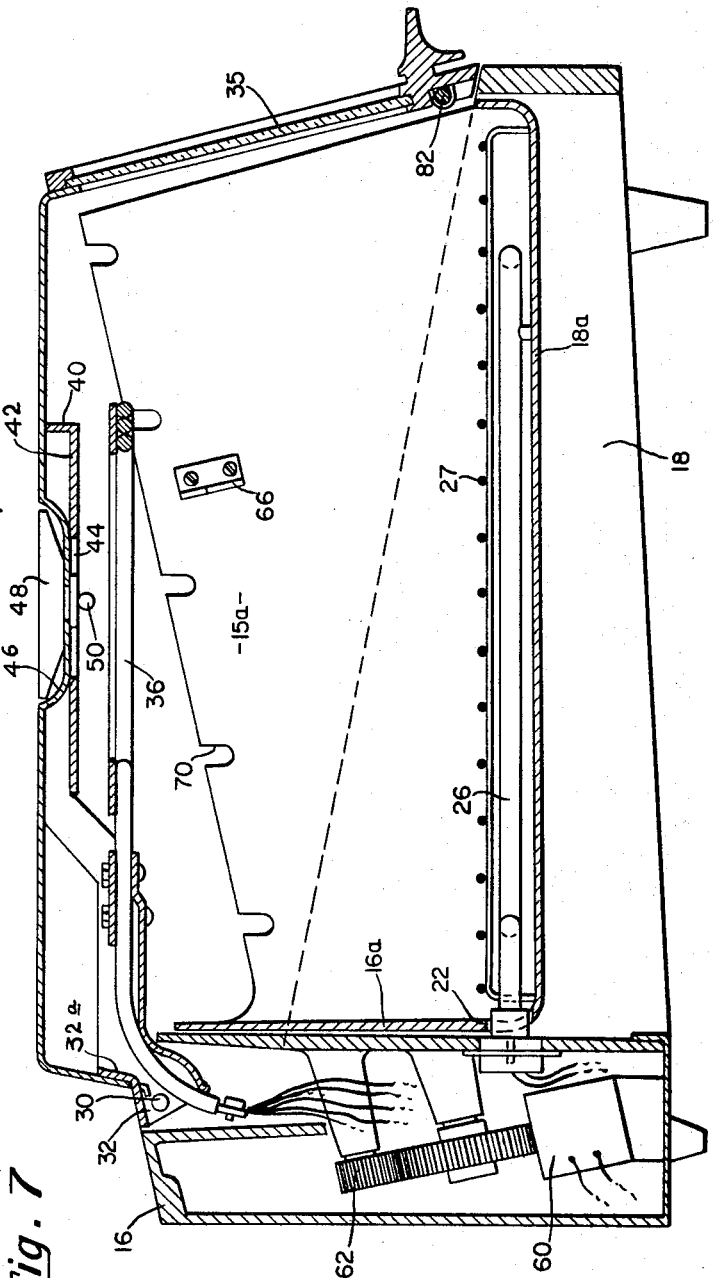
FIG. 7 is a sectional view comparable to FIG. 1 but showing the structure with the drive shaft removed.

The arm 40 carries a horizontal plate 42 (FIG. 7) which is formed with a slot 44. The top wall 33 is formed with a circular recess 46 in which is journaled for rotation the shaft of a handle 48. The lower end of the shaft carries a horizontal pin 50. When the pin is in the position shown in full lines in FIG. 2, it locks the lid structure to the arm. When the handle is rotated 90°, the pin clears slot 48 so that the lid may be raised free of the arm. As shown in FIG. 3, the end of the lid top is formed with tongues 52 which fit into slots 54 shown in the hinge mount. As a result, the rest of the lid may be disengaged from the mount when the lid is raised high enough to clear the lip 32a of the mount. The heating element 36 and the arm 40, it will be understood, will remain in the position shown in FIG. 1 and are readily available for inspection and cleaning.

As shown, the rear structure 16 includes a chamber housing the electrical connections and controls (not shown) for the heating element 26 and the heating element 36. The chamber also includes an electric motor 60 with appropriate gearing 62 which presents one element 64 of a drive coupling towards the portion 16a of the rear wall structure. The drive shaft 28 which is mounted on the bearing 66 and carries worm teeth 28a extends through the opening 24 and presents the other element 68 of the coupling to the first element 64 so that the two are operatively engaged.

Figure 2:
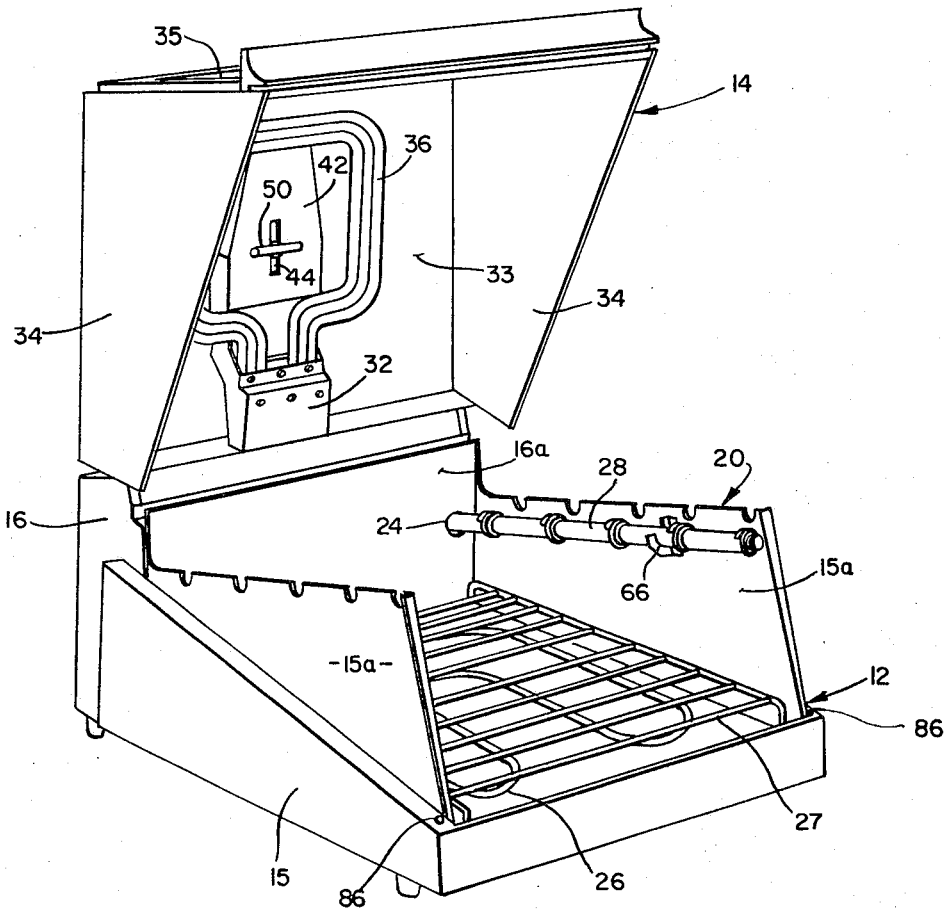
FIG. 2 is a reduced perspective view showing the device with the lid open exposing the upper heating element.
Figure 3:
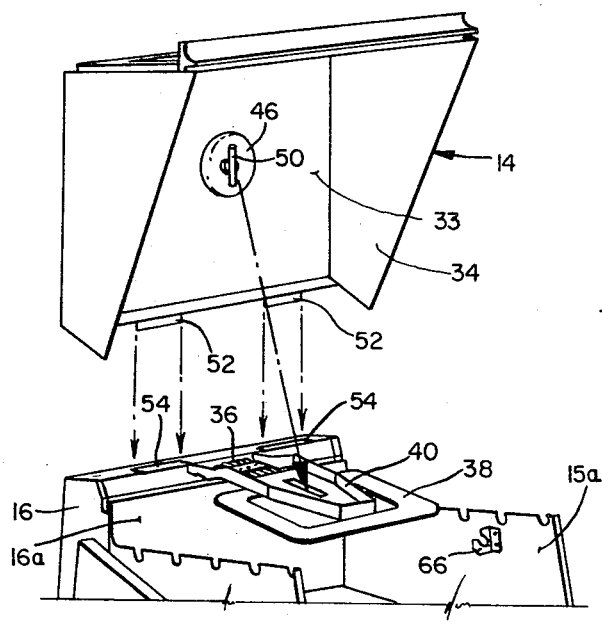
FIG. 3 is a partially exploded perspective view showing the lid portion detached from its mounting.

As shown in FIG. 2, the drive shaft 28 slopes up from the rear structure 16 toward the front of the device. The top edges of the wall portions 15a slope upward parellel to the shaft and are notched as at 70 above the worm segments 28a. The sloping disposition of these parts is an essential characteristic of the invention as will be referred to later.

Figure 6:
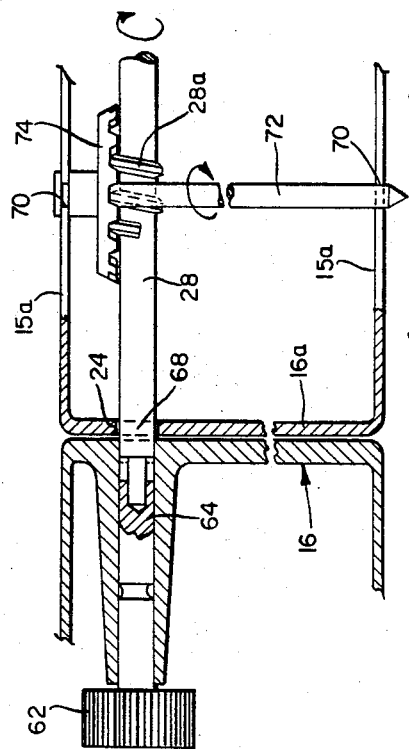
FIG. 6 is an enlarged fragmentary sectional view broken for convenience and taken on the line 6–6 of FIG. 5.

One or more of the notches 70 and its aligned counterpart on the other wall portion 15a may rotatably support respective skewers as in a barbecue operation. As shown in FIG. 6, the skewers 72 may be provided with a crown gear 74 to engage the worm segments 28a, respectively, so that rotation of the drive shaft 28 induces corresponding rotation of the skewers. Alternatively, the skewers may be replaced by a single spit (not shown) disposed between the notches on the side wall 15a and similarly engaging the drive shaft. The notches 70 may also support a wire grill frame 76 (FIG. 4).

Referring again to FIG. 1, the front wall 35 of the lid 14 may be provided with a glass window. Pivotally mounted at the bottom edge of the front wall is a horizontal rod 82 which has at its opposite ends legs 84 (FIG. 5). The distal ends of these legs when swung down from upward storage position to the position shown in FIG. 5 may be received into appropriate recesses 86 in the bottom wall structure 18. This, as shown, holds the lid ajar (FIGS. 4 and 5) with the upper heating element 36 parallel to the plane of the mass of material on the skewers (FIG. 5) or grill 76. This provides uniform cooking during the broiling operation. This is extremely important and is the reason for the sloping structure of the shaft 38 and the upper edge of the wall portions 14.

Other features of the device include the provision of storage room (not shown) for skewers and other parts in the base structure 18 beneath the base portion 18a. Actuators for controls for the electrical elements and motor may be conveniently mounted on the front of the base structure 18 and extension shafts may extend through the base structure 18 back to controls in the chamber in the rear wall structure 16.

A significant feature is the disposition of the heating elements 36a touching each other so as to mutually induce higher temperatures in each other to increase efficiency of the unit.

It must be seen that I have developed a multipurpose cooking device capable of easy shift from baking to broiling by simple redisposition of the parts. The conversion to broiling permits parallel disposition of the mass of material being cooked and the upper heating element to assure uniform cooking. At the same time, the capacity of the unit as an oven may be altered by holding the lid ajar as shown in FIG. 5. My versatile cooking device is capable of easy disassembly for cleaning and provides convenient storage for its various parts.

While the invention has been described in only one form, it will be obvious to those skilled in the art that it is not so limited and the invention may be contemplated as described in the appended claim language.

I claim:

1. A tabletop oven-broiler comprising a container including a lower member having a base supporting a lower heating element, side walls and a rear wall, and a lid member having a top wall and front wall, the rear of the top wall being hingedly secured to the top of the rear wall to close down on the lower member to provide a closed unit for baking using the lower heating element, the top wall releasably carrying on its underside an upper planar heating element, means in the lower member for supporting a mass of material to be broiled in a substantially planar array, the plane sloping upward from the rear up toward the front, and means to support the lid member hinged open with the upper heating element in a plane substantially parallel to the plane of the supporting means to provide an open unit for broiling using the upper heating element.

2. An oven-broiler as described in claim 1 wherein the supporting means comprises a pair of spaced parallel racks adapted to hold a plurality of skewers in the plane of the supporting means, and means to rotate the skewers.

3. An oven-broiler as described in claim 1 wherein the planar heating element is a plurality of contiguous heating rods superposed by a reflector element.

4. An oven-broiler as described in claim 1 wherein portions of the side walls and portions of the rear wall and base are formed as an integral shell which may be removed from the rest of the lower member.

5. An oven-broiler as described in claim 4 wherein the shell is formed with an opening to permit exposure therethrough of electric connection means and the lower heating element is releasably connectable through said opening to said connection means.

6. An oven-broiler as described in claim 1 wherein the rear portion of the top wall includes lid mounting means from which the rest of the lid is readily separable, the mounting means having a wire tunnel through which the electric leads to the upper heating element pass without exaggerated twisting.